March 5, 1968   J. W. STEPHENSON   3,371,683
HYDRAULIC VALVES
Filed Dec. 22, 1964

United States Patent Office 3,371,683
Patented Mar. 5, 1968

3,371,683
HYDRAULIC VALVES
James Wardhaugh Stephenson, London, England, assignor to Boving and Co. Limited, London, England, a British company
Filed Dec. 22, 1964, Ser. No. 420,376
Claims priority, application Great Britain, Jan. 16, 1964, 1,982/64
5 Claims. (Cl. 137—599.1)

ABSTRACT OF THE DISCLOSURE

A hydraulic valve which includes a valve rotor, a by-pass passage and a throttle member serves as a dual-purpose valve for full-bore or throttle flow, particularly in a turbine-pump installation.

---

This invention relates to hydraulic valves and provides a valve which enables liquid flow through a pipe-line or duct to be shut-off, opened full-bore, so that energy loss is low, or throttled to effect a required loss of energy.

Such a valve is particularly useful for upstream control of water flow in a hydraulic turbine installation in which a turbine is reversible to operate as a pump to return water to an upper pond, for water conservation, during any period, such as at night in a hydro-electric installation, when power is available to be fed back to the turbine.

In such an installation, when the upper pond level is low, the static head, against which the turbine pumps, may be insufficient to prevent cavitation and consequent damage in the turbine. It is therefore necessary to throttle flow of the pumped water so as to supplement the static head by the energy absorption of inefficient flow.

Valves which have been used as throttle valves, such as needle or spear and sleeve valves, have the disadvantage of relatively low efficiency in the fully open condition, the loss coefficient being high compared with that of a rotary plug or spherical valve which gives full-bore opening. It is of course possible to provide a full-bore opening valve and a throttle valve in parallel, for alternative use, but this is costly.

The valve of the present invention is a dual-purpose valve to serve as a full-bore or throttle valve.

According to the invention, in a hydraulic valve comprising a valve body and a valve rotor mounted to turn in the valve body between a closed position and an open position at which the valve rotor allows full-bore unrestricted flow through the valve body, the valve body is formed with a passage for flow to by-pass the valve rotor in its closed position and a throttle valve member is provided in the valve body to control flow through the by-pass passage.

In a preferred construction embodying further features of the invention, the rotor is a spherical rotor, the by-pass passage is formed by a double-walled spherical valve body and the throttle valve member is a sleeve, in a cylindrical extension from the valve body, movable axially across a surrounding end of the by-pass passage.

The throttle sleeve may, in its closed position, seal by its end against the valve rotor, to close the by-pass passage, and a similar sleeve may be provided in a cylindrical extension from the valve body at the other side of the rotor to close the other end of the by-pass passage for cutting-off flow so as to isolate the by-pass passage, for service and maintenance purposes for example.

A spherical valve according to the invention is illustrated, by way of example, on the accompanying drawing, in which.

Figure 1:
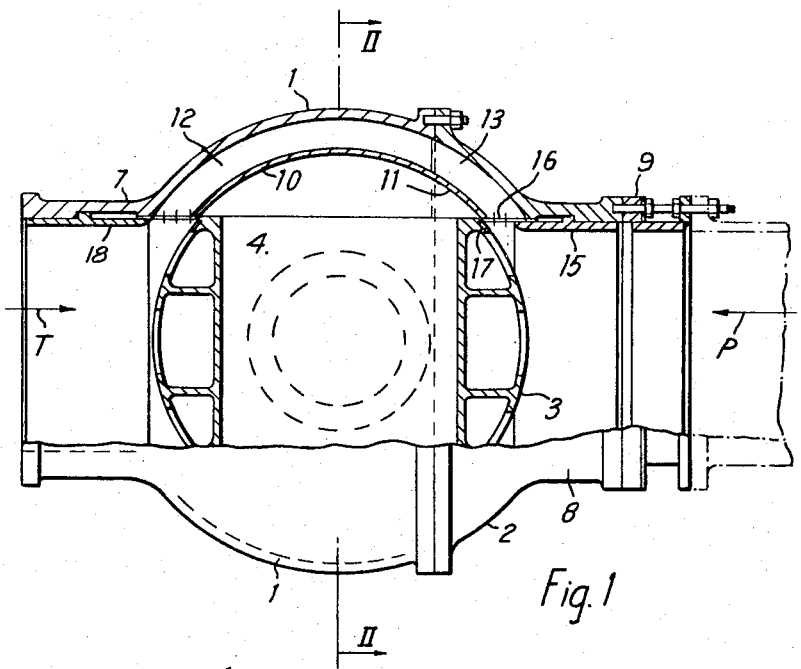
FIG. 1 is an axial section, with the valve body partly shown in elevation.

The drawing shows a spherical valve body, made in two parts 1 and 2, and a spherical rotor 3 with a bore 4 of the nominal diameter for full-bore opening through the valve.

Figure 2:
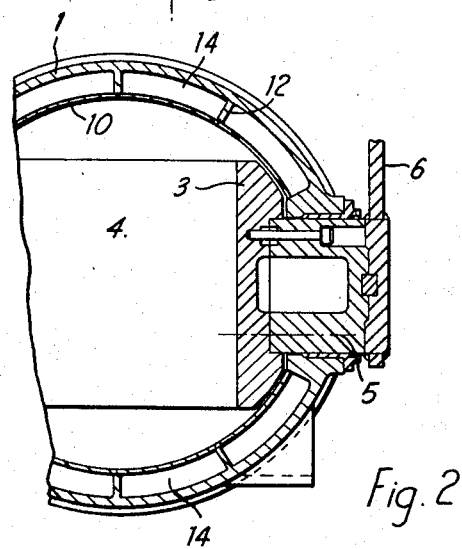
FIG. 2 is a cross-section on the line II—II of FIG. 1.

The rotor 3 is journalled in the valve body by sealed trunnions, one of which, reference 5, is shown in FIG. 2, and means, indicated as a lever 6 in FIG. 2, are provided for turning the rotor through 90° from the closed position shown to a full-bore open position.

The valve body has axial cylindrical extensions 7 and 8 for connection into a pipe-line by flanged joints 9 as indicated in FIG. 1.

As so far described, the valve is of a generally known kind.

The features introduced by the present invention will now be described.

The valve body is made double-walled through its spherical part so that a spherical inner wall 10, 11 carried by internal longitudinal ribs 12, 13 forms a by-pass passage, composed of channels 14, around the rotor. Preferably, the total cross-sectional area for flow through the channels 14 is at least equal to full-bore opening through the valve but this is not essential.

In the valve body extension 8, a throttle sleeve 15 is axially movable across the surrounding ends of the channels 14 which open as a ring of ports around the path of the sleeve 15. The ends of the ribs 13 have bearing strips 16, of Phosphor bronze for example, to support and guide the end of the sleeve 15 in its axial movement. When fully across the ends of the channels 14, the edge of the sleeve 15 enters and seals in an annular sealing groove 17 in the rotor 3.

Any suitable means, hydraulic, mechanical or electrical can be provided to effect controlled axial movement of the sleeve 15.

It can be seen that, when the rotor is closed as shown, water can flow through the by-pass channels 14 under the throttling control of the sleeve 15, according to the axial position of the sleeve.

The sleeve 15 can therefore be used to provide any desired constriction on pumped flow, indicated by the arrow P, from a pump turbine downstream of the valve.

To permit full-bore flow, indicated by the arrow T, to drive the turbine, the rotor 3 is turned to its open position and the by-pass passage is then short-circuited by the rotor bore 4.

The channels 14 can be isolated from flow by an isolating sleeve 18 in the valve body extension 7. The sleeve 18 may be constructionally identical to the sleeve 15 so that either can be used as a throttle although, for isolating use only, the sleeve 18 need be provided only with a simple manual moving means.

Although the valve of the present invention has been described as suitable for use with a reversible turbine, it will be appreciated that it can be applied to any use requiring low-loss or full-bore flow and throttle control.

I claim.

1. A hydraulic valve comprising a valve body, a cylindrical extension of said valve body extending axially in the direction of flow through said valve body, a valve rotor having a bore and mounted to turn in said valve body between a closed position and an open position for full-bore unrestricted axial flow through said valve body, a by-pass passage in said valve body, by-passing said valve rotor and communicating with said extension, and a throttle valve sleeve mounted coaxially in said extension and slidable therein to close or variably open said by-pass passage.

2. A valve according to claim 1, in which said valve body is provided with a second cylindrical extension and throttle valve sleeve therein, the two extensions and sleeves being located respectively at opposite ends of said by-pass passage, and said sleeves, in closed positions, isolating said by-pass passage.

3. A valve according to claim 1, in which said by-pass passage has a total cross-sectional area for flow therethrough at least equal to said bore of said valve rotor.

4. A valve according to claim 1, in which said valve rotor is a spherical rotor and said valve body is concentrically spherical around said valve rotor.

5. A valve according to claim 4, in which said valve body around said valve rotor is of double-walled construction forming said by-pass passage.

References Cited

UNITED STATES PATENTS

| | | | |
|---|---|---|---|
| 3,171,429 | 3/1965 | Sturmer et al. | 251—315 X |
| 87,522 | 3/1869 | Stratton | 137—599 |
| 2,842,153 | 7/1958 | Volpin | 251—367 X |

WILLIAM F. O'DEA, *Primary Examiner.*

DAVID MATTHEWS, *Assistant Examiner.*